United States Patent [19]

Whiteside

[11] Patent Number: 4,918,470
[45] Date of Patent: Apr. 17, 1990

[54] APPARATUS FOR CONTROLLING THE COLOR BALANCE OF A PHOTOGRAPHIC IMAGE

[75] Inventor: George D. Whiteside, Lexington, Mass.

[73] Assignee: Polaroid Corporation, Cambridge, Mass.

[21] Appl. No.: 279,659

[22] Filed: Dec. 5, 1988

[51] Int. Cl.⁴ .............................................. G03B 21/00
[52] U.S. Cl. .................................. 354/21; 354/430; 354/482
[58] Field of Search .......................... 354/482, 430, 21

[56] References Cited

U.S. PATENT DOCUMENTS

| | | | |
|---|---|---|---|
| 3,246,586 | 4/1966 | Hunt | 354/482 |
| 3,468,228 | 9/1969 | Rogers | 95/12.20 |
| 3,580,149 | 5/1971 | Fujisawa | 354/482 |
| 3,615,539 | 10/1971 | Land | 96/76 |
| 3,672,268 | 6/1972 | Scheibel et al. | 354/430 |
| 3,753,392 | 8/1973 | Land | 95/13 |
| 3,942,183 | 3/1976 | Whiteside | 354/29 |
| 4,041,308 | 8/1977 | Fujita | 354/482 |
| 4,199,244 | 4/1980 | Shenk | 354/195 |
| 4,199,246 | 4/1980 | Muggli | 354/195 |
| 4,229,090 | 10/1980 | Driscoll et al. | 354/86 |
| 4,329,411 | 5/1982 | Land | 430/30 |
| 4,736,215 | 4/1988 | Hudspeth et al. | 354/21 |

*Primary Examiner*—Russell E. Adams
*Attorney, Agent, or Firm*—John J. Kelleher

[57] ABSTRACT

A selected one of two or more variable density color filters is automatically positioned in the optical axis of a taking lens of a photographic camera, if necessary, prior to an exposure in order to automatically effect a color balanced exposure of a photosensitive material located within the camera. The color balance of a photographic image formed in a photosensitive material is dependent upon several factors. These factors include the color balance of the photosensitive material, the color temperature of scene illumination and the temperature of the photosensitive material processing fluid. In the present arrangement, the position of the variable density filter in the optical path of the taking lens is concurrently dependent upon one or more of these factors which, under certain conditions, may collectively offset one another such that movement of a variable density color filter for photographic image color balancing purposes does not occur.

14 Claims, 4 Drawing Sheets

APPARATUS FOR CONTROLLING THE COLOR BALANCE OF A PHOTOGRAPHIC IMAGE

BACKGROUND OF THE INVENTION

1. Field of the Invention

The present invention relates to the color balancing of photosensitive materials, in general, and to an optical filter system for automatically effecting a color balanced exposure of photosensitive material within a photographic camera, in particular.

2. Description of the Prior Art

The color balance of an image formed in a photosensitive material is dependent upon several factors. One factor is the color balance of the photosensitive material itself. The continuous manufacture of large quantities of photosensitive materials over extended periods of time, especially materials of the self-developing type, requires fairly complex processes that are relatively difficult to control. One consequence of employing such complex processes is an occasional unwanted shift in the color balance from a nominal or desired color balance, a shift that produces an excessive level of one particular color in an image subsequently formed in such materials. A more detailed explanation of this problem is described in U.S. Pat. No. 4,329,411 to Land.

Image color balance is also affected by the color temperature of scene illumination. The color temperature may produce a concentration of light frequencies at the higher or lower energy portions of the spectrum. An outdoor exposure of a scene, for example, may include a substantial area of blue sky having a relatively high color temperature with the scene light being predominately composed of relatively high frequency radiation at the blue end of the spectrum.

A color balance shift will also occur in an image formed in photosensitive materials of the self-developing type if the temperature of a processing fluid forming a portion of a film unit employing such materials is raised or lowered beyond certain temperature limits during material processing.

Optical filters have been employed in the past for balancing the color of an image formed in photosensitive materials located within a photographic camera. In commonly assigned U.S. Pat. No. 4,736,215 to Hudspeth et al, for example, a film cassette is provided with indicia or machine readable information on an external surface thereof corresponding to one or more film variables of a film unit enclosed within the film cassette. A camera into which the film casette is insertable is provided with three optical filters for controlling photosensitive material color balance, each of which is selectively movable into the optical axis of a taking lens of the photographic camera under control of signals developed by reading means within the camera responsive to the film cassette indicia. A disadvantage of this optical filter color balancing system is that it only compensates for color imbalance factors of the photosensitive material itself and not for color imbalance generating factors external of the film or film cassette.

In commonly assigned U.S. Pat. No. 3,468,228 to Rogers, an automatic shutter mechanism for a photographic camera is disclosed which incorporates a selection of color balancing filters. The filters compensate for color balance shifts produced by scene illumination color temperature. The filters are simultaneously positioned over both the photosensor of an exposure timing system and the taking aperture of a shutter for a time interval that is inversely related to the intensity of the light transmitted by the compensating filter. A disadvantage of this color balancing optical filter system is that it only compensates for color imbalance caused by scene illumination color temperature and not for color imbalance factors caused by the photosensitive material or other color imbalance producing factors external of the photosensitive material.

SUMMARY OF THE INVENTION

It is a primary object of the present invention, therefore, to provide an optical filter system for controlling the color imbalance of a photographic image formed in a photosensitive material caused by factors internal and external of the photosensitive material.

It is another object of the present invention to increase the range of temperatures over which photosensitive materials of the self-developing type may be processed without affecting the color balance of a photographic image subsequently formed in such materials.

It is a further object of the present invention to compensate for the color imbalance in photosensitive materials that naturally occurs when the time between manufacture and the subsequent use of such materials in a photographic camera extend much beyond a fairly predictable period of time.

Other objects, features and/or advantages of the present invention will be readily apparent from the following detailed description of a preferred embodiment thereof when taken in conjunction with the accompanying drawings.

In accordance with a preferred embodiment of the present invention, an apparatus is provided for automatically effecting a color balanced exposure of photosensitive material within a photographic apparatus. A selected one of two or more color filters is automatically positioned in the optical axis of a taking lens of a photographic apparatus, if necessary, prior to exposure in response to a combination of factors both internal and external of the photosensitive material having an effect on the color balance of a photographic image subsequently formed in said material. When all of these factors are combined, the resulting combination may cause a color filter to be placed in the optical axis of the taking lens, or these factors may collectively offset one another such that positioning of a color filter in the optical axis of the taking lens of the photographic apparatus for color balancing purposes is not required.

DESCRIPTION OF A PREFERRED EMBODIMENT

Figure 1:
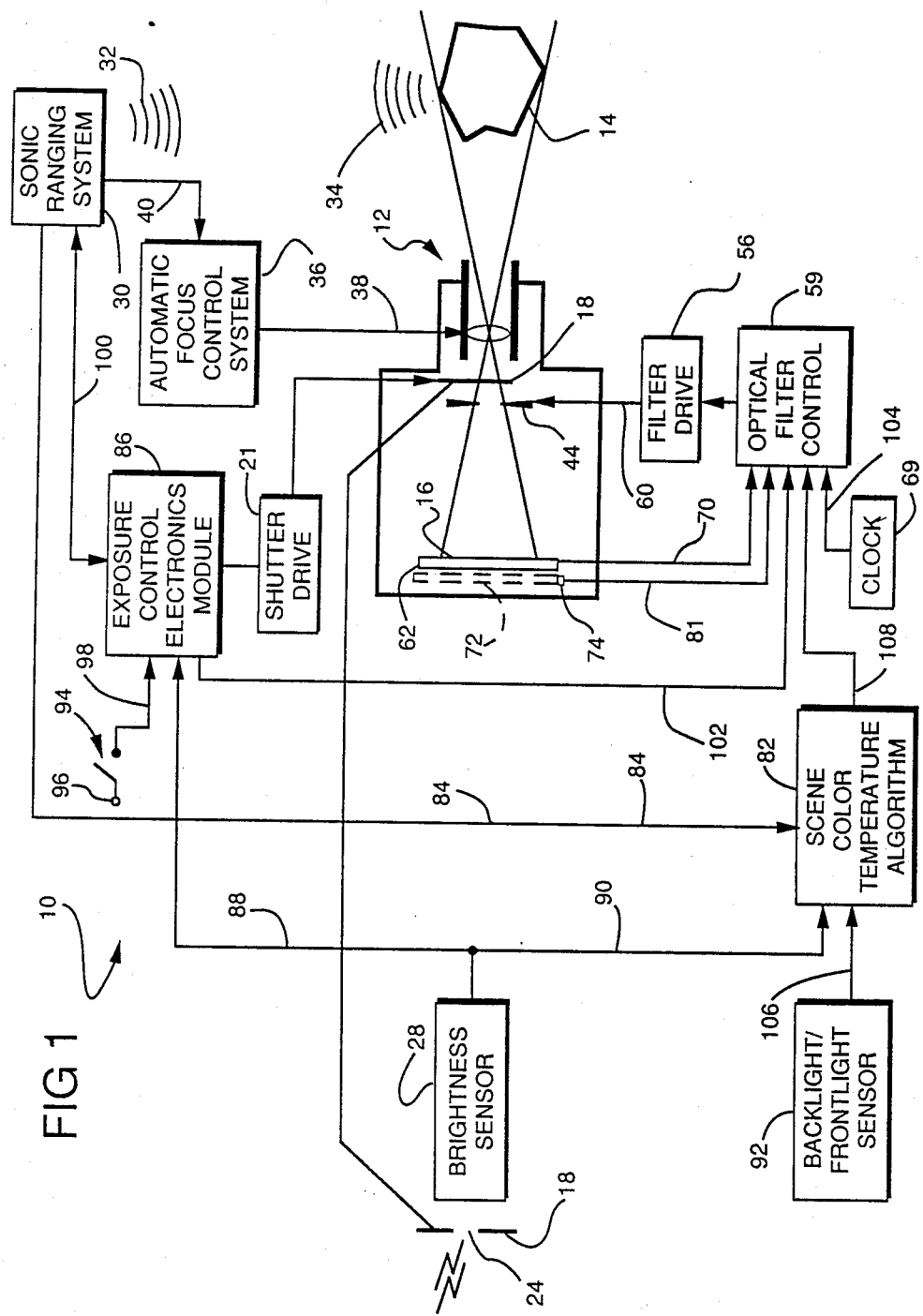
FIG. 1 is a schematic diagram of a photographic camera of the self-developing type which incorporates a preferred embodiment of the optical filter color balancing apparatus of the present invention.

Referring now to the drawings, and specifically to FIG. 1, there is shown a photographic camera 10 of the self-developing type which incorporates a preferred embodiment of the color balancing apparatus of the present invention. Camera 10 incorporating this color balancing apparatus includes an objective or taking lens 12 comprising a plurality of elements (not shown) retained in a spaced relation by a conventional cylindrical lens mount which may be adapted in a well-known manner to provide translational movement of the elements of the lens 12 along a central optical axis for focusing image-carrying light rays of, for example, an object 14 on a film plane 16 through an aperture formed in a shutter assembly 18.

Figure 2:
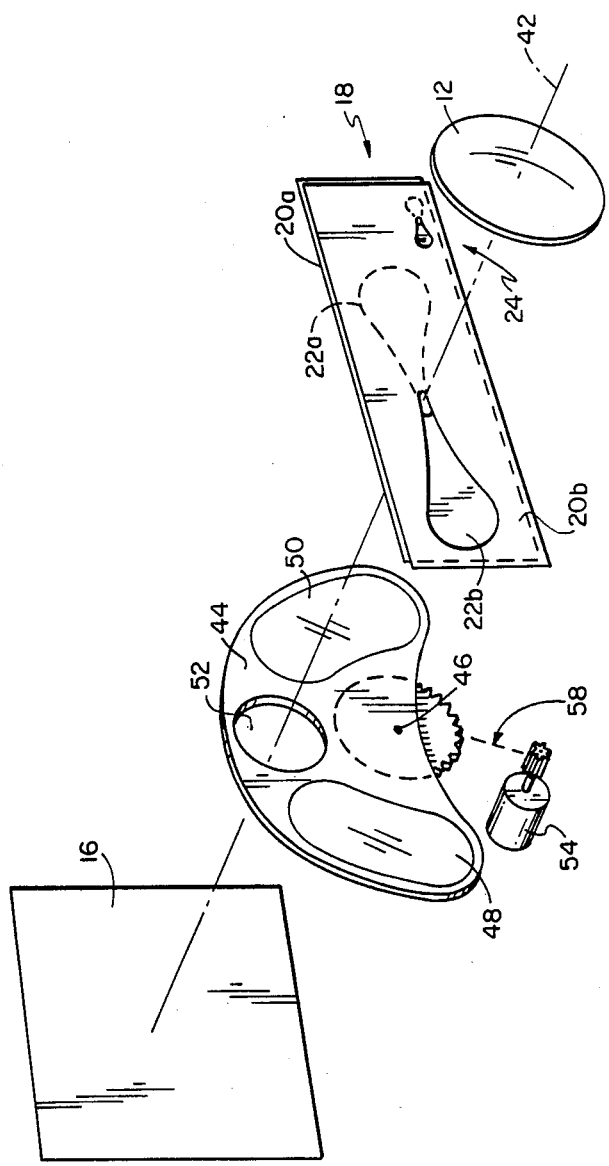
FIG. 2 is an exploded perspective view of portions of the optical filter system and other exposure control components of the camera of FIG. 1.

With additional reference to FIG. 2, the shutter assembly 18, positioned intermediate of the lens 12 and the film plane 16, includes a pair of overlapping shutter blade elements 20a and 20b of the "scanning" type. Scene light admitting primary apertures 22a and 22b are respectively provided in each of the shutter blade elements to cooperatively define a progressive variation of effective aperture openings in accordance with simultaneous longitudinal and lateral displacement of one blade element with respect to the other blade element in a manner more fully described in commonly assigned U.S. Pat. No. 3,942,183 to Whiteside, now specifically incorporated herein by reference. The blade element apertures are selectively shaped so as to overlap the optical axis 42 of the lens 12 thereby defining a gradually varying effective aperture size as a function of the position of the blade elements 20a and 20b of the shutter assembly 18. A shutter drive 21 is provided for displacing the shutter blade elements 20a and 20b. The shutter drive includes a tractive electromagnetic device in the form of a solenoid (not shown) employed to displace the shutter blade elements with respect to one another in a manner more fully described in the abovenoted Whiteside patent.

Each of the shutter blade elements 20a and 20b additionally includes a secondary aperture with an aperture in one blade element cooperating with an aperture in another blade element to form an opening 24 therethrough. These secondary apertures may be configured to track in a predetermined corresponding relationship with respect to the scene light admitting primary apertures 22a and 22b within the shutter assembly 18. With the primary and secondary apertures being formed in the same blade elements and therefore being mechanically coupled to one another, it is readily apparent that the secondary apertures can move in the same manner as the primary apertures when controlling scene light passing through the secondary-aperture-formed opening 24 transmitted from a scene being photographed to a photoresponsive element (not shown) forming a part of a brightness sensor 28. An example of scanning blade elements having primary and secondary apertures that cooperate to control the amount of scene light admitted to a photosensitive element is shown in U.S. Pat. No. 3,942,183, supra.

The photographic camera 10 is provided with a sonic ranging system 30 that includes a ranging circuit and an ultrasonic transducer (neither shown) which may be actuated to transmit a burst of sonic energy 32 toward a subject to be photographed, such as the subject 14. The transducer thereafter operates to detect an echo 34 of the burst of sonic energy reflected from the subject 14. The total round trip time for a burst of sonic energy to be transmitted toward and an echo thereof to be reflected from the subject 14 and detected by the transducer in the sonic ranging system 30 is a fairly accurate measure of camera-to-subject distance. An electrical signal representative of this round trip time is subsequently employed to focus the adjustable focus lens 12. U.S. Pat. No. 4,199,246 to Muggli describes such a sonic rangefinder in much greater detail. An automatic focus control system 36, coupled to the adjustable focus lens 12 through a path 38 causes the lens 12 to focus a sharp image of the subject 14 on the film plane 16 during an exposure interval in response to an electrical signal from the sonic ranging system 30 through a path 40, a signal representative of the distance between the subject 14 and the camera 10. An example of an automatic focus control system functioning in this manner is more fully described in U.S. Pat. No. 4,199,244 to Shenk.

As previously noted, the color balance of a photographic image formed in a photosensitive material is dependent upon such factors as the color balance of the photosensitive material itself, the temperature of the liquid employed in the developing process and the color temperature of scene illumination. These factors are preferably compensated for in accordance with the present invention by positioning either a blue or yellow variable density filter over the exposure aperture formed by the cooperating apertures 22a and 22b, respectively formed in the scanning blades 20a and 20b of the shutter assembly 18 on an optical axis 42 of the lens 12 prior to each exposure in accordance with certain criteria to be described below, once it is determined that such color balancing compensation is necessary.

As is best shown in drawing FIG. 2, a filter carrier 44 is mounted for rotation about an axis 46 to position a yellow variable density filter 48 or a blue variable density filter 50 supported thereon, or an opening 52 formed therein on the optical axis 42 of the lens 12 between the shutter assembly 18 and the film plane 16. Movement of the filter carrier 44 about the axis 46 may be effected by suitable means such as a stepper motor 54 in a filter drive 56 coupled to the filter carrier 44 through a conventional gear train 58. The filters 48 and 50, supported on the filter carrier 44 on opposite sides of the aperture or opening 52, are of a wedge shape design with their thinnest light-filtering dimensions being adjacent the opening 52 and with their thickest light-filtering dimension being remote therefrom. An alternate, though less preferable, form of these color balancing variable density filters might be an optically transparent substrate of uniform thickness, such as a piece of plain glass, that is coated on one side with a material that transmits (or absorbs) one or more light frequencies and whose optical density varies in at least one direction in the plane of the optical coating.

The positioning of the filter carrier 44 is controlled by an optical filter control 59 through the filter drive 56 and a path 60. The optical filter control 59 controls the positioning of the filter carrier 44 in response to a plurality of input signals. As noted above, the photographic camera 10 is of the self-developing type and is adapted to receive a photographic film cassette 12 which includes a plurality of self-developing film units stacked therein of the type shown and described in U.S. Pat. No. 3,615,539 to Land. As shown in detail in the just-mentioned Land patent, each film unit includes a rupturable pod or container of processing liquid secured to one end of adjacent photosensitive and image-receiving elements for dispensing its liquid contents therebetween for film developing purposes in response to the application of a compressive force by a pair of juxtaposed rollers, as shown in the above-mentioned Land patent, subsequent to exposure. A perspective view of the film cassette 62 is shown in drawing FIG. 3.

Figure 3:
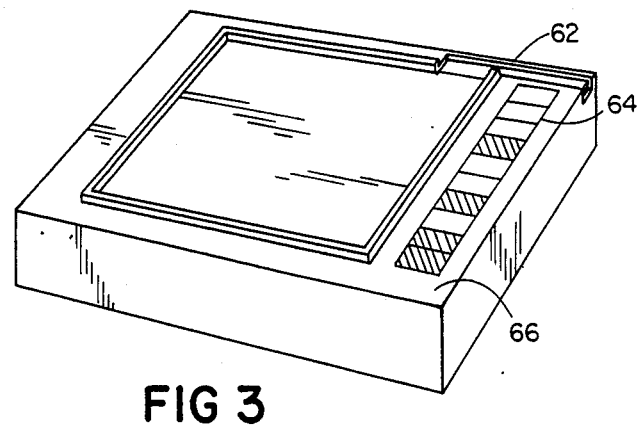
FIG. 3 is a perspective view of a film cassette enclosing a plurality of photograhic film units of the self-developing type, having external indicia thereon representative of one or more enclosed film unit related variables.
Figure 4:
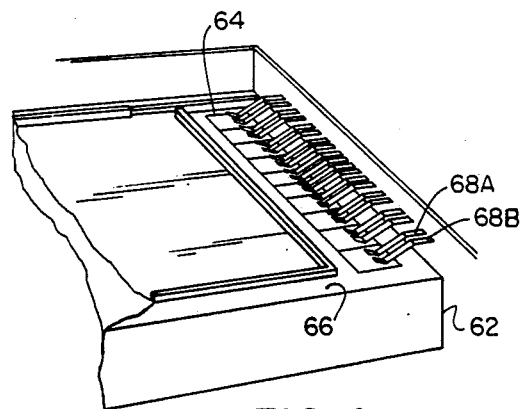
FIG. 4 shows the film unit indicia of FIG. 3 interfacing with a portion of the indicia reading apparatus incorporated, in the photographic camera of FIG. 1.

With additional reference to FIG. 3 of the drawings, the photographic film cassette 62 includes a binary indicia 64 on a surface 66 thereof. In this, the preferred embodiment, the indicia 64 comprises a series of ten adjacent areas that are electrically isolated from one another. Each of these areas is formed of an electrically conductive or an electrically non-conductive material. When the cassette 62 is fully inserted in the camera 10 such that an uppermost film unit within the cassette 62 is located in the film plane 16 thereof, such as is shown in U.S. Pat. No. 4,229,090 to Driscoll et al, each indicia area is brought into contact with a pair of electrical contacts such as contact pair 68A and 68B as shown in drawing FIG. 4.

The combination of a contact pair and a cooperatively engaged indicia area can have either of two possible binary states. On the one hand, if the indicia area in contact with an electrical contact pair is electrically non-conductive, this combination of indicia area and contact pair would be an open circuit or in a binary "0" state. On the other hand, if the indicia area in contact with an electrical contact pair is electrically conductive, this combination of indicia area and contact pair would be a closed circuit or in a binary "1" state. Inasmuch as there are ten combinations of indicia areas and associated contact pairs that can have either of two possible binary states, up to $2^{10}$ or 1,024 bits of information may be encoded within the indicia 64 on the photographic film cassette 62. In the present invention, such encoded information includes color balance data and the date of manufacture of the photosensitive material within the cassette 62. This encoded information is routed to the optical filter control 59 through a path 70. The date of manufacture information encoded within the indicia 64 is combined with timing information from a camera clock 62 within the optical filter control 59 to generate a signal representative of the date of manufacture of the photosensitive materials within the film cassette 62 where it is employed as a factor in the positioning of the filter carrier 44.

As briefly mentioned above, each instant-type film unit within the photographic film cassette 62 includes a rupturable container or pod of processing liquid that is spread between adjacent photosensitive and image-receiving layers or elements of the film unit for film developing purposes. This type of processing liquid has what is sometimes referred to as a processing temperature latitude (PTL) or a temperature range within which temperature variations of the processing liquid does not have an adverse effect on the color balance of the photosensitive material on which it is spread, for film developing purposes. Processing liquid temperature variations above or below this temperature range will adversely effect the photosensitive material color balance. A common PTL temperature range for such processing liquid is between 55 and 85 degrees fahrenheit.

If the photosensitive material is processed by a processing liquid whose temperature is greater than the PTL temperature range, a resulting image will have an excessive amount of yellow content, and if the processing liquid temperature is less than the PTL temperature range, a resulting image will have an excessive amount of blue content. In order to compensate for these adverse temperature effects on the processing liquid and on the image subsequently processed by such liquid, a chamber is provided for temporarily storing an exposed film unit during the developing process. The chamber temperature is monitored and chamber temperature measurements that fall outside of the above-described PTL temperature range are employed as an additional factor in positioning the filter carrier 44 in the scene light path of the camera 10 for photosensitive material color balance compensation purposes. The chamber for storing an exposed film unit during the developing process is shown in drawing FIG. 5.

Figure 5:
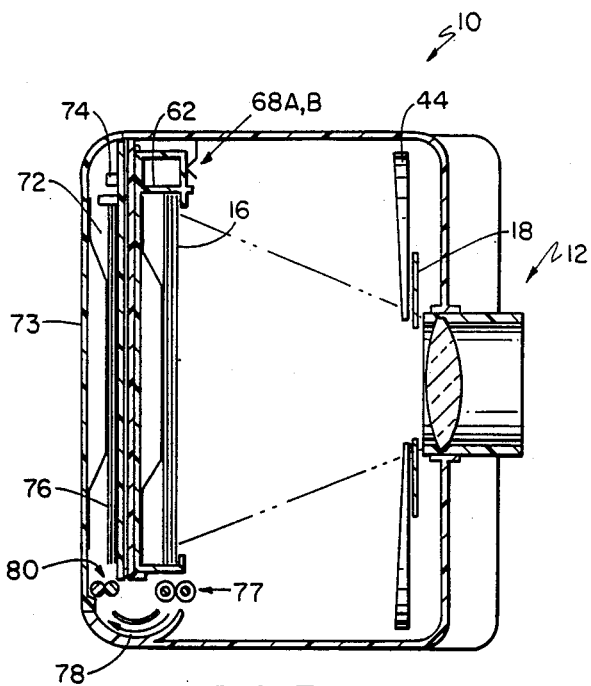
FIG. 5 is an elevational view, in section, of the camera of FIG. 1 showing a chamber in which a film unit is temporarily stored during the developing process.

FIG. 5 is an elevational, sectional view of the camera 10 showing a chamber 72, in which an exposed film unit is temporarily stored during the developing process, and a temperature sensor 74 for monitoring chamber 72 temperature. As shown in FIG. 5, an exposed film unit 76 that was positioned in the film plane 16 of the camera 10 by the placement of the cassette 62 within the carrier 10 through a conventional access door 73 formed in a housing wall thereof was moved into the bite of the edge-gripping guide roller pair 77 that, in turn, moved the film unit 76 into a chute 78 and then into the bite of a pair of spread rollers 80 by a film unit advancing mechanism (not shown) such as that described in U.S. Pat. No. 3,753,392 to Land. The rollers 80, which are coupled to a drive motor (not shown) and form a part of the above-mentioned advancing mechanism, rupture the pod of processing liquid located at the leading edge of the exposed film unit 76 and thereafter spread its contents between photosensitive and image-receiving layers thereof while simultaneously advancing the exposed film unit 76 into the chamber 72. As shown in FIG. 1, a signal representative of the temperature within the chamber 72, as sensed by the temperature sensor 74, is routed to the optical filter control 59 through a path 81 where it is employed as a factor in the positioning of the filter carrier 44.

As noted above, the color balance of a photographic image formed in a photosensitive material is also dependent upon the color temperature of scene illumination. If, for example, the scene light is composed predominantly of blue light, as from a scene including a large area of blue sky, the resulting image in photosensitive material exposed to such a scene may have an excessive amount of blue content. In another fairly common situation, the scene to be photographed may be composed of tonally warmer colors having an excessive amount of yellow content. An excessive amount of either of these colors in a scene will alter the color balance of a photographic image thereof. As shown in FIG. 1 of the drawings, apparatus is provided for determining the color temperature and for deriving a signal representative thereof to control the positioning of the filter carrier 44 and thereby compensate for such excessive amounts of color balance altering scene colors.

The apparatus for determining scene color temperature includes the scene color temperature algorithm 82. The algorithm 82 has been structured such that it accepts three scene or subject related inputs and derives a signal in response thereto representative of scene color temperature. One such input is that of subject distance. When the sonic ranging system 30 derives a subject distance signal for lens focusing purposes, this same signal is routed to the color temperature algorithm 82 through a path 84. Similarly, when the brightness sensor 28 senses the scene brightness level and routes a signal representative thereof to an exposure control electronics module 86 through a path 88 for the control of the shutter mechanism in the shutter assembly 18, this same signal is also routed to the algorithm 82 through a path 90. The third input to the color temperature algorithm 82 is provided by a backlight/frontlight photometer or sensor 92. This sensor corrects for differences in illumination between a subject of principal interest in the central portion of a scene to be photographed and the subjects of secondary interest in the foreground and background portions of the scene. The sensor 92, together with electronic circuitry (not shown), causes a change to be made in the exposure interval generated by the shutter assembly 18 when significant differences in illumination between a central portion of the scene and the background or foreground are present. A photometer or sensor of this type is shown and described in U.S. Pat. No. 4,285,584 to Canter, and the disclosure therein is specifically incorporated herein by reference.

OPERATION

A typical filter carrier 44 positioning sequence and film exposure cycle will now be described. With reference to FIG. 1 of the drawings, a switch 94 is actuated to its closed position by a camera operator thereby coupling a source of electrical power (not shown) connected to a terminal 96 to the exposure control electronics module 86 through a path 98. As noted above, the camera 10 is of the SLR type and employs scanning-type shutter blades. When the exposure control electronic module 86 is activated by the closure of the switch 94, it causes the brightness sensor 28 to sense scene light through the aperture 24, causes sonic ranging system 30 to be actuated through a path 100 to determine the distance to the subject 14, causes the scanning blade shutter of the shutter mechanism 18 to be actuated to its closed or light blocking position by the shutter drive 21 and causes the optical filter control 59 to be activated through the path 102.

The activation of the optical filter control 59 causes it to read the color balance and date of manufacture data encoded within indicia 64 on photographic film cassette 62 through the path 70, the temperature of the chamber 72 that is monitored by the temperature sensor 74 through the path 81 and the time output of the clock 69 through a path 104. Also, a signal representative of scene color temperature is derived by scene color temperature algorithm 82 in response to a subject distance signal from the sonic ranging system 30 through the path 84, a scene brightness level signal from the brightness sensor 28 through the path 90 and a backlight/frontlight signal from the backlight/frontlight sensor 92 through a path 106. This scene color temperature signal is, in turn, routed to the optical filter control 59 through a path 108. The optical filter control 59 combines each of these input signals to control the actuation of the filter drive 56 and the positioning of the filter carrier 44 for the placement of the filters 48 or 50 of a particular optical density in the optical axis 42 of the taking lens 12 for color balancing purposes or the aperture 52 of the filter carrier 44 in the optical axis 42 if the combination of input signals to the optical filter control 59 indicates that in light of all of the sensed or encoded conditions, color balancing of an image to be formed in photosensitive material at the film plane 16 of the camera 10 is not required.

The subject 14 distance information established by the sonic ranging system 30 for the scene color temperature algorithm 82 is also applied to the automatic focus control system 36 through the path 40 where, in response thereto, the control system 36 positions the taking lens 12 through the path 38 to correct focus position.

After the positioning of the filter carrier 44 for image color balance correcting purposes, if such positioning is required, and the focusing of the objective lens 12, the exposure control electronics module 86 causes the shutter drive 21 to actuate the shutter assembly 18 coupled thereto and thereby generate an exposure interval, in a conventional manner, in correspondence with the previously derived scene light brightness level signal generated by the brightness sensor 28 and routed to the exposure control electronics 86 through the path 88.

When exposure of the instant type film unit at the focal plane 16 is complete, a film unit advancing mechanism, such as that described in the above-mentioned '392 patent to Land, moves the exposed film unit, such as the film unit 76, into the guide rollers 77 that, in turn, move the film unit 76 into the chute 78 and then into the bite of the spread rollers 80. The spread rollers 80 rupture the pod of processing liquid located at one end of the film unit 76, spread its contents between certain layers thereof while simultaneously advancing the film unit into the lighttight chamber 72 for completion of the developing process, as explained in greater detail above.

Upon completion of an exposure interval by the shutter mechanism 18 and transportation of an exposed film unit to the chamber 72 to complete its developing, the optical filter control 59 positions the aperture 52 of the filter carrier 44 in the optical axis 42 of the objective lens 12 in preparation for the exposure of the next film unit within the photographic film cassette 62.

The optical filters 48 and 50, supported on the rotatable filter carrier 44, have been described in the preferred embodiment as variable density yellow and blue filters, respectively. Two such optical filters can be employed to compensate for most, but not all, of the conditions that can adversely affect the color balance of an image formed in a photosensitive material. It should be noted that an optical filter system comprising three variable density optical filters could be employed to compensate for all of the conditions that might adversely affect a photographic image. However, such a system would be more costly and the control of the positioning of these filters would be significantly more difficult to implement than the preferred two-filter system decribed above. A portion of a three-filter variable density optical fitler system is shown in drawing FIG. 6.

Figure 6:
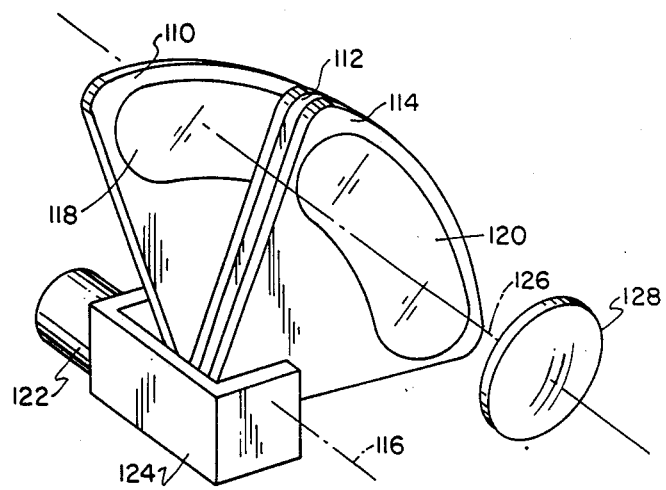
FIG. 6 shows an alternate form of the color balancing optical filter shown in drawing FIG. 2.

With reference to FIG. 6 of the drawings, three separate filter carriers 110, 112 and 114 of a three-filter optical filter system are mounted for rotation about an axis 116. The filter carrier 110 supports a yellow wedge-shaped optical filter 118 which absorbs the color blue, the filter carrier 112 supports a magenta wedge-shaped optical filter (not shown) which absorbs the color green and the filter carrier 114 supports a blue wedge-shaped filter 120 which absorbs the color red. A stepper motor 122 is selectively coupled to the filter carriers 110, 112 or 114 by a conventional coupling means 124. The sensed and derived information employed to determine the extent to which or whether or not an optical filter is positioned in the optical axis 42 of the taking lens 12 in drawing FIG. 2 is also employed in a similar manner to determine the extent to which or whether or not the optical filters supported on the filter carriers 110, 112 and 114 are positioned in an optical axis 126 of a taking lens 128 shown in drawing FIG. 6, for image color balancing purposes. An optical filter control system (not shown) such as the optical filter control system 59 shown in drawing FIG. 1, derives a filter positioning signal in response to the above-mentioned sensed and derived information. This signal is then employed to actuate the stepper motor 122 and a filter carrier selectively coupled thereto to a particular filter position through the coupling means 124, for image color balancing purposes, if the sensed and derived information mentioned above determines that such filter positioning is required. As in the two-filter optical filter systems, any filter positioned in the optical axis 126 of the lens 128 would be moved out of the axis 126 after an exposure interval in preparation for the exposure of the next film unit.

From the foregoing description of the invention, it will be apparent to those skilled in the art that various improvements and modifications can be made in it without departing from its true scope. The embodiment described herein is merely illustrative and should not be viewed as the only embodiment that might be encompassed by the invention.

What is claimed is:

1. Photographic apparatus comprising:
    a film cassette for containing at least one frame of a photosensitive material and having indicia on an external surface thereof in which a characteristic of the photosensitive material is encoded in a binary format;
    means for supporting the photosensitive material in position for exposure;
    means for directing scene light along an optical path and onto the photosensitive material during an exposure;
    an optical filter assembly having at least one filter, said optical filter assembly having a first mode of operation wherein one filter is positioned within said optical path and filters the scene light before it strikes the photosensitive material, and a second mode of operation wherein said one filter is located out of the optical path and scene light is permitted to strike the photosensitive material in an unfiltered condition;
    means responsive to an encoded photosensitive material characteristic in said indicia and to a factor external of the photosensitive material for generating a composite signal representative of the extent such characteristic and factor may have on the color balance of a photographic image subsequently formed in such photographic material; and
    means coupled to said optical filter assembly and responsive to said composite signal for placing said optical filter assembly in either said first or second modes of operation in accordance with said signal, prior to the exposure of the photosensitive material.

2. The photographic apparatus of claim 1 wherein said optical filter assembly includes a filter carrier for rotatably supporting a pair of variable density optical filters, each of a different color, that are separated from each other by an aperture, said placing means is coupled to said filter carrier and said placing means positions one of said filters or said aperture in said scene light path in response to said color balance signal.

3. The photographic apparatus of claim 2 wherein each of said variable density filters are of a wedge shape that linearly varies from a minimum density to a maximum density with the minimum density of said filter being adjacent said aperture and the maximum density of said filter being remote therefrom.

4. The photographic apparatus of claim 3 wherein one of said variable density filters is blue and the other of said variable density filters is yellow.

5. The photographic apparatus of claim 1 wherein said optical filter assembly includes three filter carriers with each carrier rotatably supporting a different color variable density optical filter, said placing means is selectively coupled to each of said filter carriers and said placing means positions one of said filters in said scene light path in response to said color balance signal.

6. The photographic apparatus of claim 5 wherein each of said variable density filters are of a wedge shape that linearly varies from a minimum density light filtering portion to a maximum density light filtering portion with the minimum density portion of each of said filters entering said scene light path before said maximum density portion when positioned into the scene light path in response to said color balance signal for light filtering purposes.

7. The photographic apparatus of claim 6 wherein one of said variable density filters is cyan, one of said variable density filters is magenta and the remaining variable density filter is yellow.

8. Photographic apparatus comprising:
    a film cassette for containing at least one frame of a photosensitive material and having indicia on an external surface thereof in which the color balance of the photosensitive material is encoded in a binary format;
    means for locating the film cassette in position for the subsequent exposure of the photosensitive material;
    means for directing scene light along an optical path and onto the photosensitive material during an exposure cycle;
    an optical filter assembly having at least one filter, said optical filter assembly having a first mode of operation wherein said one filter is positioned within said optical path and filters the scene light before it strikes the photosensitive material, and a second mode of operation wherein said one filter is located out of the optical path and scene light is permitted to strike the photosensitive material in an unfiltered condition;
    means responsive to the color temperature of a scene to be photographed and to the color balance of the photosensitive material encoded in said indicia for generating a composite signal representative thereof; and
    means coupled to said optical filter assembly and responsive to said composite signal for placing said optical filter assembly in either said first or second modes of operation in accordance with said composite signal, prior to the commencement of an exposure of the photosensitive material.

9. Photographic apparatus for use with a film cassette containing at least one self-developing film unit having a layer of photosensitive material and a quantity of processing liquid enclosed in a portion thereof, comprising:
- means for locating the film cassette in position for the subsequent exposure of the photosensitive material;
- means for directing scene light along an optical path and onto the photosensitive material during an exposure cycle;
- means for spreading the processing liquid across a layer of the film unit subsequent to its exposure to the scene light so as to initiate the formation of a visible image within the film unit;
- a chamber formed within said photographic apparatus for temporarily receiving the film unit after said spreading of the processing liquid across the layer of the film unit;
- an optical filter assembly having at least one filter, said optical filter assembly having a first mode of operation wherein said one filter is positioned within said optical path and filters the scene light before it strikes the photosensitive material, and a second mode of operation wherein said one filter is located out of the optical path and scene light is permitted to strike the photosensitive material in an unfiltered condition;
- means responsive to the temperature in said chamber and to the color balance of the photosensitive material for generating a composite signal representative thereof; and
- means coupled to said optical filter assembly and responsive to said composite signal for placing said optical filter assembly in either said first or second modes of operation in accordance with said composite signal prior to the commencement of an exposure of the photosensitive material.

10. Photographic apparatus for use with a film cassette containing at least one frame of a photosensitive material of the self-developing type including a quantity of processing liquid enclosed in a portion thereof, comprising:
- means for locating the film cassette in position for the subsequent exposure of the photosensitive material;
- means for directing scene light along an optical path and onto the photosensitive material during an exposure cycle;
- means for spreading the processing liquid across a layer of the film unit after exposure to the scene light;
- a chamber formed within said photographic apparatus for temporarily receiving the frame of photosensitive material after said spreading;
- an optical filter assembly having at least one filter, said optical filter assembly having a first mode of operation wherein said one filter is positioned within said optical path and filters the scene light before it strikes the photosensitive material, and a second mode of operation wherein said one filter is located out of the optical path and scene light is permitted to strike the photosensitive material in an unfiltered condition;
- means responsive to the temperature in said chamber and to the color temperature of the scene to be photographed for generating a composite signal representative thereof; and
- means coupled to said optical filter assembly and responsive to said composite signal for placing said optical filter assembly in either said first or second modes of operation in accordance with said composite signal, prior to the commencement of an exposure of the photosensitive material.

11. Photographic apparatus for use with a film cassette containing at least one frame of a photosensitive material of the self-developing type including a quantity of processing liquid enclosed in a portion thereof, comprising:
- means for locating the film cassette in position for the subsequent exposure of the photosensitive material;
- means for directing scene light along a path and onto the photosensitive material during an exposure cycle;
- means for spreading the processing liquid across a layer of the film unit after exposure to the scene light;
- a chamber formed within said photographic apparatus for temporarily receiving the frame of photosensitive material after exposure to the scene light and after said spreading means has spread the processing liquid;
- an optical filter assembly having at least one filter, said optical filter assembly having a first mode of operation wherein said one filter is positioned within said optical path and filters the scene light before it strikes the photosensitive material, and a second mode of operation wherein said one filter is located out of the optical path and scene light is permitted to strike the photosensitive material in an unfiltered condition;
- means responsive to the temperature in said chamber, the color temperature of the scene to be photographed and to the color balance of the photosensitive material for generating a composite signal representative thereof; and
- means coupled to said optical filter assembly and reponsive to said composite signal for placing said optical filter assembly in either said first or second modes of operation in accordance with said composite signal, prior to the commencement of an exposure of the photosensitive material.

12. The photographic apparatus of claim 11 wherein the film cassette has indicia thereon representative of the color balance of photosensitive material contained therein and said composite signal is derived, in part, in response to the indicia on the film cassette.

13. The photographic apparatus of claim 12 wherein the indicia comprises a plurality of adjacent electrically conductive and electrically non-conductive areas on an external surface of the film cassette with the collective conductivity and non-conductivity of the surface areas being representative of the color balance of the photosensitive material contained within the film cassette.

14. The photographic apparatus of claim 11 wherein the film cassette has indicia thereon representative of the date of manufacture of the photosensitive material contained therein, said apparatus further includes means responsive to the date of manufacture indicia for generating a signal representative thereof, and said placing means is additionally responsive to said date of manufacture signal.

* * * * *